Jan. 4, 1955     H. L. BROCK     2,698,543
TRACTOR DRIVING MECHANISM

Filed Oct. 10, 1950     3 Sheets-Sheet 1

H.L. BROCK
INVENTOR.

BY E.C. McRae
J.R. Faulkner
G.H. Oster

ATTORNEYS

Jan. 4, 1955   H. L. BROCK   2,698,543
TRACTOR DRIVING MECHANISM
Filed Oct. 10, 1950   3 Sheets-Sheet 2
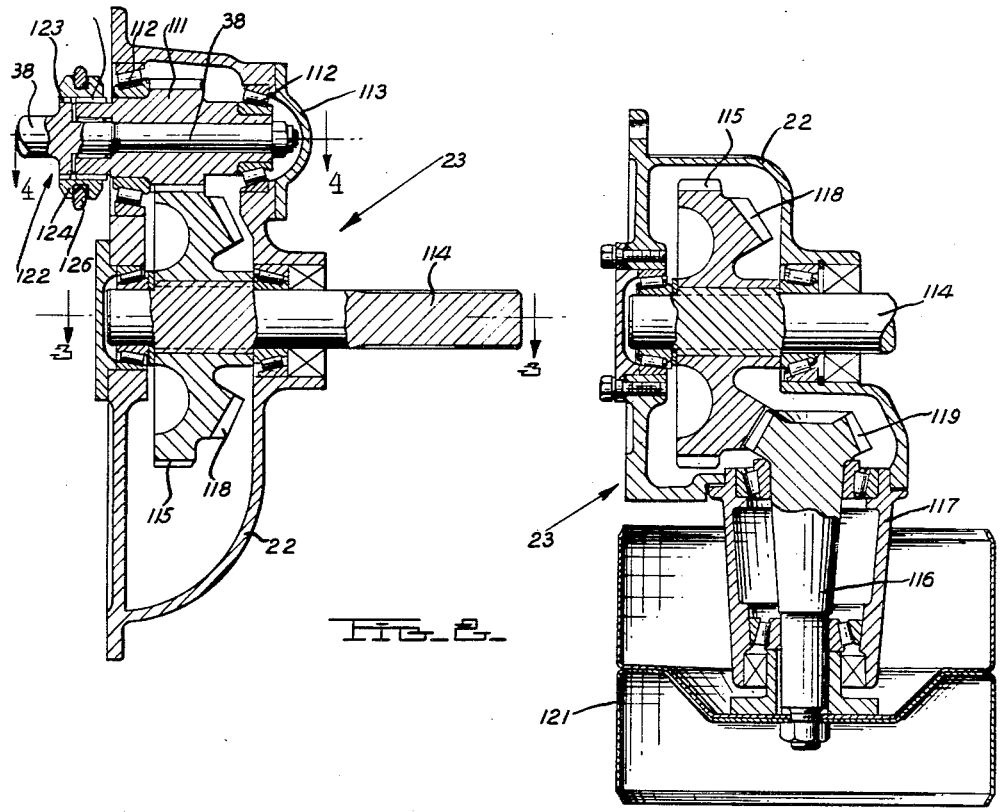
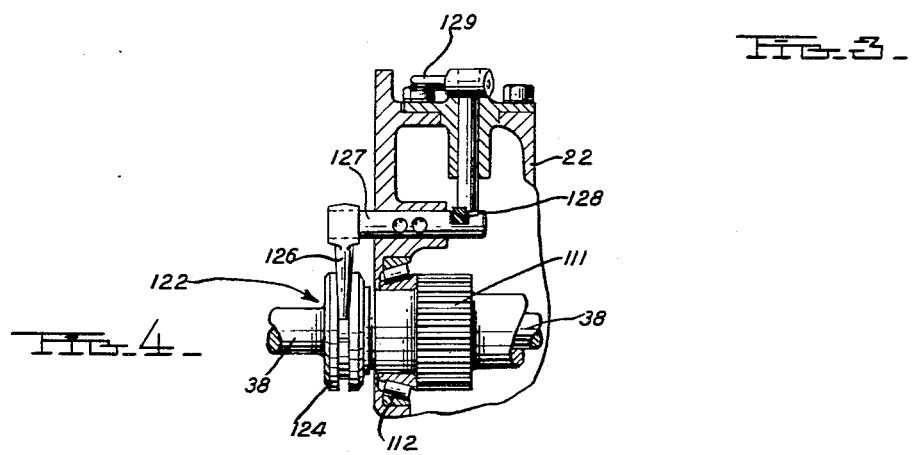
H. L. BROCK
INVENTOR.
BY E. C. McRae
J. R. Faulkner
J. H. Oster
ATTORNEYS Jan. 4, 1955        H. L. BROCK        2,698,543
TRACTOR DRIVING MECHANISM
Filed Oct. 10, 1950                                 3 Sheets-Sheet 3
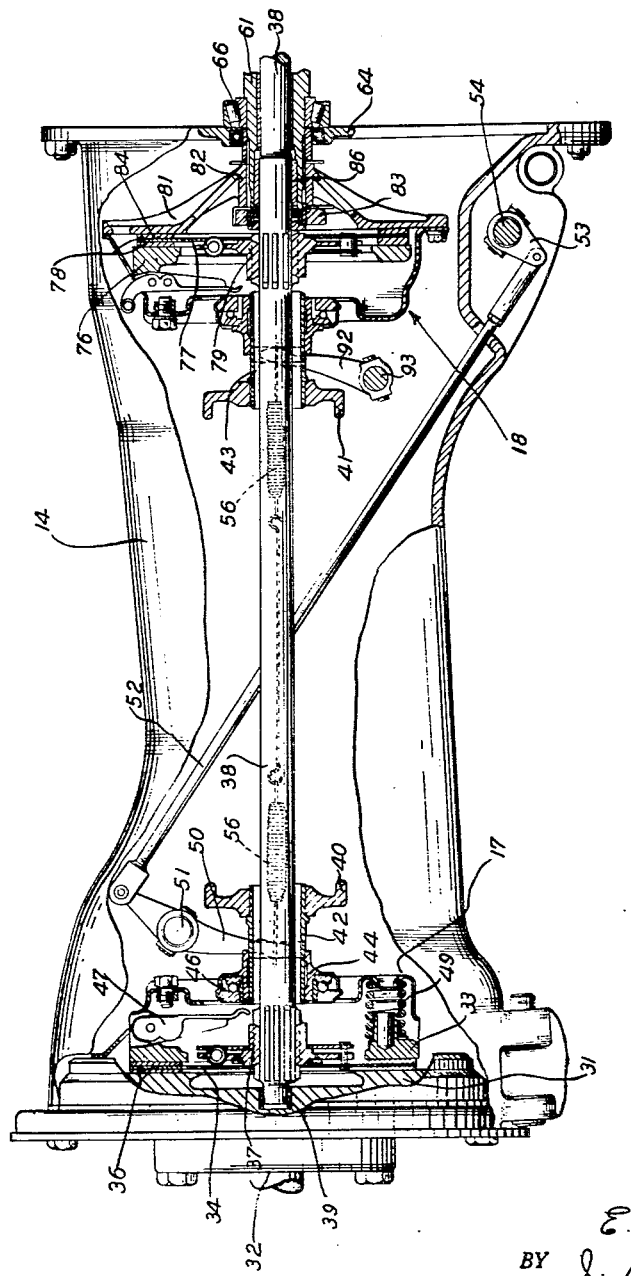
H. L. BROCK
INVENTOR.
BY E. C. McRae
J. L. Faulkner
J. H. Oster
ATTORNEYS

United States Patent Office 2,698,543
Patented Jan. 4, 1955

2,698,543

TRACTOR DRIVING MECHANISM

Harold L. Brock, Detroit, Mich., assignor to Ford Motor Company, Dearborn, Mich., a corporation of Delaware Application October 10, 1950, Serial No. 189,445

1 Claim. (Cl. 74—15.63)

This invention relates generally to tractors and more particularly to tractor driving mechanisms.

An object of the present invention is to provide a driving mechanism for a tractor in which the engine power is utilized not only to drive the rear traction wheels of the tractor but also to provide mechanical power for operating implements and accessories and to provide hydraulic power for raising and lowering implements and controlling the operation thereof. A further object is to accomplish this with mechanism which is compactly and efficiently arranged and which can be suitably and easily controlled by the tractor operator to perform the varied functions of tractor operation, implement control and accessory operation.

Still another object of the present invention is to provide tractor driving mechanism utilizing one clutch to control the transmission of engine power not only to the tractor wheels but also to the power takeoff shaft and the hydraulic pump, and utilizing a second clutch to independently control the transmission of engine power to the tractor transmission, rear axle and rear driving wheels so that the tractor may be stopped and started at any time without interfering with the continuous operation of the power takeoff shaft and hydraulic pump mechanism. This is accomplished in the present construction by providing a driveshaft axially aligned with the engine crankshaft and extending from adjacent the rearward end of the crankshaft to the extreme rearward portion of the tractor chassis. Intermediate its ends the driveshaft is surrounded by a driving sleeve carrying gearing and functioning as the main shaft of the tractor transmission. The hydraulic pump and power takeoff mechanism are driven by the driveshaft and have driving connections with the driveshaft rearwardly of the transmission driving sleeve. A pair of friction clutches are provided between the engine and the transmission, one clutch serving to connect the crankshaft with the forward end of the driveshaft and the other serving to connect the driving sleeve of the transmission with an intermediate portion of the driveshaft. This arrangement permits the latter clutch to be disengaged to interrupt the transmission of engine power to the tractor transmission, rear axle and drive wheels without interrupting the transmission of engine power to the hydraulic pump and power takeoff mechanism. Another feature of the construction is the utilization of two clutches having a large number of interchangeable parts to simplify and make more economical not only the original construction but the servicing of the tractor. Suitable independent controls for the two clutches are provided. The arrangement of the present construction results in a compact, economically manufactured and serviced, and efficiently controlled tractor driving mechanism for supplying power to the tractor wheels and to implements and accessories.

Other objects and advantages of the present invention will be made more apparent as this description proceeds, particularly when considered in connection with the accompanying drawings wherein:

Figure 2 is an enlarged vertical cross sectional view of the power takeoff mechanism.

Figure 3 is a horizontal cross sectional view taken on the line 3—3 of Figure 2.

Figure 4 is a horizontal cross sectional view taken on the line 4—4 of Figure 2.

Figure 5 is an enlarged cross sectional view of a portion of the construction shown in Figure 1.

Figure 1:
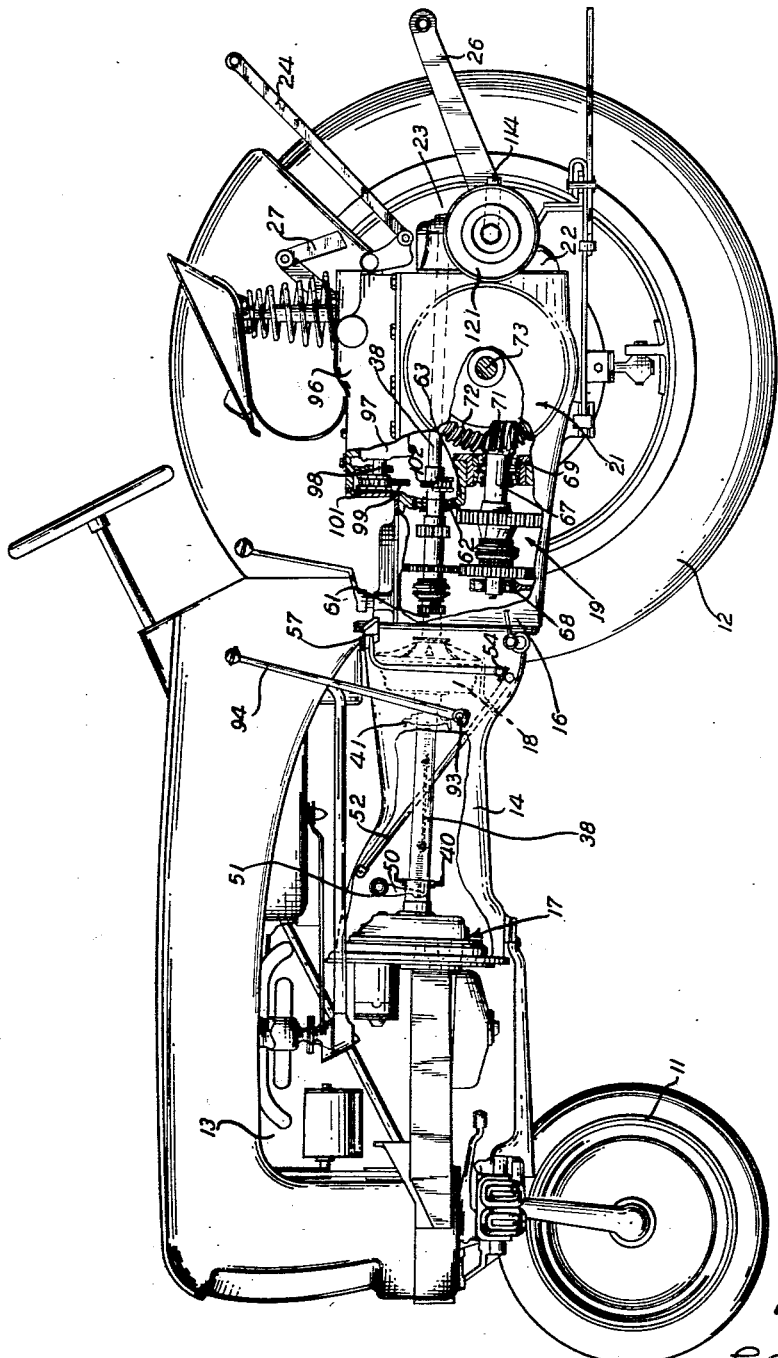
Figure 1 is a side elevation, partly broken away and in section, of a tractor embodying the present invention.

Referring particularly to Figure 1, but also to Figure 5, there is shown an agricultural tractor having front steering wheels 11 and rear driving or traction wheels 12 carried by a tractor chassis comprising an internal combustion engine 13, a clutch housing 14, and a transmission and rear axle housing 16 suitably bolted together. The clutch housing 14 houses a main clutch 17 at its forward end and a second clutch 18 at its rearward end. The transmission and rear axle housing 16 contains a multiple speed transmission 19 of the spur gear type and a rear axle assembly 21. An auxiliary housing 22 is bolted to the rearward end of the transmission and rear axle housing 16 and contains power takeoff mechanism 23. The tractor also is equipped with conventional upper and lower links 24 and 26 to which implements may be attached, and lifting linkage 27 actuated by conventional hydraulic mechanism (not shown) for raising and lowering the links and the implements.

As best shown in Figure 5, the main clutch 17 comprises a flywheel 31 mounted at the rearward end of the engine crankshaft 32 and conventionally supporting a pressure plate 33 mounted for reciprocation toward and away from the friction face of the flywheel 31. A sheet metal disc 34 carrying annular friction linings 36 is located between the flywheel 31 and pressure plate 33, the hub 37 of the disc being splined to the forward end of a drive shaft 38. The drive shaft 38 is journaled in bearing 39 at its forward end and extends rearwardly entirely through the clutch housing 14 and the transmission and rear axle housing 16, the rearward end of the driveshaft driving the power takeoff mechanism 23 as described later more in detail.

Integrally formed with the clutch housing 14 and extending transversely across the housing are a pair of generally channel shaped webs 40 and 41. These webs are formed with apertures into which short support tubes 42 and 43 respectively are press fitted. The tubes encircle the driveshaft 38, providing clearance therebetween, and support the clutch throwout mechanisms for the clutches 17 and 18. The clutch throwout mechanism for the front clutch 17 comprises a sliding collar 44 slideably mounted upon the turned forward end of the support tube 42. The clutch throwout collar 44 supports a conventional throwout bearing 46 engageable with an actuating lever 47 for reciprocating the pressure plate 33.

The clutch is engaged by means of springs 49 and is disengaged by a throwout lever 50 pivotally mounted upon a cross shaft 51 supported in the housing. The lower end of the clutch throwout lever 50 is formed in the shape of a fork and is engageable with the clutch throwout collar 44 to reciprocate the latter. The upper end of the lever 50 is connected by means of a link 52 to a crank arm 53 mounted upon a cross shaft 54 journaled in the clutch housing 14 at the lower rearward end thereof. The shaft 54 protrudes from the left side of the tractor and supports a clutch pedal 57 in convenient position for operation by the driver of the tractor to disengage the main clutch 17 when desired. Coil springs 56 on opposite sides of the driveshaft 38 retract the clutch throwout lever.

From the foregoing it will be seen that the main clutch 17 selectively connects the crankshaft of the engine with the driveshaft 38. The second clutch 18, at the rearward end of the clutch housing 14, selectively connects the driveshaft 38 with the drive sleeve 61 of the transmission 19. The rearward end of the drive sleeve 61 is journaled in bearings 62, Figure 1 mounted in an intermediate wall 63 of the transmission and rear axle housing 16. The forward end of the drive sleeve 61 extends through the front wall 64 of the housing and is journaled in bearings 66 mounted in this wall. For the purposes of this invention, it is only necessary to mention, in connection with the transmission 19, that the drive sleeve 61 carries gearing arranged, through intermediate gearing (not shown) to drive gearing on a countershaft 67 at various forward and reverse speeds. The countershaft 67 is parallel to the axis of the drive sleeve 61 and is journaled in bearings 68 and 69 mounted in the housing 16. The rearward end of the countershaft 67 carries a drive pinion 71 meshing with the ring gear 72 of a conventional differential for the rear axle 73. The rear axle 73 includes axle shafts extending laterally outwardly to the rear drive or traction wheels 12 of the tractor. It will be noted that the longitudinally extending drive shaft 38 extends over the rear axle 73 to the power takeoff mechanism 23 mounted in the housing 22 at the rearward end of the transmission and rear axle housing 16.

A pump housing 96 is bolted to the upper side of the transmission and rear axle housing 16 and contains a hydraulic pump 97 which may be of any desired type. The pump shaft 98 carries a sprocket wheel 99 at its forward end, the latter being connected by a driving chain 101 to a pinion 102 mounted upon the driveshaft 38 rearwardly of the intermediate wall 63 of the transmission and rear axle housing 16. The output of the pump is utilized to raise and lower the links 24 and 26 and the implement connected thereto and may also be used to provide hydraulic power for certain types of implements.

The second clutch 18 is very similar in construction to the main clutch 17 and a majority of the parts of the two clutches are identical and interchangeable. A saving in tooling, cost of manufacture and assembly, and servicing is thus effected. Because of the similarity in the construction of the two clutches, the second clutch 18 will not be described in detail. The pressure plate 76, driven disc 77, and friction lining 78 for the driven disc, are identical with the corresponding parts of the main clutch 17. The driven disc 77 has a hub 79 splined to an intermediate portion of the driveshaft 38. The pressure plate 76 of the second clutch is carried by a clutch drum 81, the hub 82 of which is splined to the forward end of the driving sleeve 61 of the transmission. A lock nut 83 holds the clutch drum upon the sleeve. The forward face 84 of the clutch drum is a planar radially extending friction face adapted to engage the adjacent annular friction lining 78 of the driven disc 77. It will be noted that antifriction bearings 86 are located between the driving sleeve 61 and the drive shaft 38.

Clutch throwout mechanism is provided for the second clutch 18. This mechanism is identical with the clutch throwout mechanism for the main clutch 17 except that it is reversed and is mounted upon the rear support tube 41. In addition, the clutch throwout lever 92 for the second clutch 18 is somewhat different, being mounted upon a cross-shaft 93 which extends outwardly from the left hand side of the clutch housing 14 and has mounted thereon a hand lever 94 for actuation by the driver of the tractor.

From the foregoing it will be seen that the second clutch 18 connects the driveshaft 38 with the driving sleeve 61 of the transmission. When the hand lever 94 is operated to disengage the second clutch 18, the driving sleeve 61 of the transmission is disconnected from the driveshaft 38 and the transmission of engine power to the transmission 19, rear axle 21 and rear traction wheels 12 of the tractor is cut off. Inasmuch as the driveshaft 38, however, extends through the driving sleeve 61 of the transmission and has driving connections with the hydraulic pump 97 and the power takeoff mechanism 23, it will be seen that disengagement of the second clutch 18 does not interrupt the continuous transmission of power to the hydraulic pump and power takeoff mechanism. Thus, during operation of the tractor in connection with implements which are power operated, either hydraulically through the fluid pressure produced by the hydraulic pump or mechanically through power from the power takeoff mechanism, it is possible to stop the tractor and still apply continuous power without interruption to the implements or to any accessories which may be power driven. As will readily be understood, this facilitates efficient operation of implements such as combines, corn pickers, loaders, grading equipment, and the like. Furthermore, harvesting equipment may be prevented from jamming, or may be readily cleared if jammed with grain or corn, since this arrangement permits the entire power of the tractor engine to be applied to the power takeoff shaft when necessary. It will also be apparent that disengagement of the main clutch 17 is effective to cut off the transmission of engine power not only to the transmission, rear axle and traction wheels, but also to the hydraulic pump and power takeoff mechanism.

Reference is now made particularly to Figures 2, 3 and 4, as well as to Figure 1, for a description of the power takeoff mechanism 23. The extreme rearward end of the driveshaft 38 rotatably supports a pinion 111 which in turn is journaled in bearings 112 mounted in the power takeoff housing 22 at the rear of the tractor. A cover plate 113 is provided adjacent the rearward end of the driveshaft 38 and may be readily removed to permit implements and accessories to be connected thereto if desired. It will be noted that power received from this connection will be at engine speed since the drive shaft 38 is wholly independent of the transmission 19 and is directly connected, by means of the main clutch 17, to the crankshaft 32 of the engine.

In many instances, however, it is desirable to provide power at a reduced speed and increased torque for the driving of various implements and accessories. For this purpose, a short power takeoff shaft 114 is journaled in bearings carried by the power takeoff housing 22. This shaft is located beneath the driveshaft 38 and is driven therefrom by means of the pinion 111 carried by the drive shaft 38 and meshing with a gear 115 on the power takeoff shaft 114. As best seen in Figure 3, a pulley shaft 116 is journaled in an extension 117 of the housing 22 and extends transversely at right angles to the power takeoff shaft 114. The gear 115 on the power takeoff shaft 114 is also provided with bevel teeth 118 meshing with a bevel pinion 119 formed on the inner end of the pulley shaft 116. A pulley 121 is suitably mounted upon the shaft 116 and for driving belt-driven accessories.

A power takeoff clutch 122 is provided for selectively disconnecting the power takeoff shaft 114 and the pulley shaft 116 from the driveshaft 38. This clutch comprises a pinion 123 formed on the driveshaft 38 and adapted to be engaged by teeth on a reciprocable clutch member 124. The clutch member 124 is splined to the hub of the pinion 111 and is adapted to be shifted in and out of engagement with the pinion 123 by means of a fork 126 carried on a rail 127 actuated by a crank arm 128 connected to a hand operated lever 129. When the clutch 122 is engaged, power from the driveshaft 38 is supplied to the power takeoff shaft 114 and also to the pulley shaft 116. When the power takeoff clutch is disengaged, the power takeoff shaft and pulley shaft are not driven, but power may still be taken from the rearward end of the driveshaft 38 by removing the cover 113.

From the foregoing it will be seen that the arrangement of the power driving mechanism of the present tractor is extremely compact and not only provides available power for a multitude of various tractor and farming operations but also provides controls enabling the power to be efficiently used and controlled under many varying circumstances.

It will be understood that the invention is not to be limited to the exact construction shown and described, but that various changes and modifications may be made without departing from the spirit and scope of the invention, as defined in the appended claim.

What is claimed is:

In an agricultural tractor, an engine, a clutch housing and a transmission housing secured to each other in longitudinal alignment, a driven flywheel at the rearward end of said engine, a pair of longitudinally spaced transversely extending channel shaped webs formed integrally with said clutch housing and extending between the opposite side walls of said clutch housing adjacent the forward and rearward ends thereof, said channel shaped webs being formed with longitudinally aligned apertures therethrough, a short support tube fixedly mounted in the aperture in each of said webs and projecting beyond the web toward the adjacent end of said clutch housing, said support tubes being in longitudinal alignment with said flywheel and with each other, a drive shaft extending freely through said support tubes, a friction disk assembly mounted upon said drive shaft forwardly of the front support tube, a pressure plate carried by said flywheel and mounted for engagement with said friction disk assembly to form a front friction clutch, clutch throw out mechanism reciprocably mounted upon the front support tube forwardly of the front web for controlling the engagement and disengagement of said front clutch, a sleeve rotatably mounted in said transmission housing and freely surrounding the rearward extension of said drive shaft, a clutch drum mounted in the rearward end of said clutch housing and secured to the forward end of said sleeve, a friction disk assembly carried by said drive shaft intermediate the rearward end of said rear support tube and the forward end of said sleeve and located adjacent said clutch drum, a pressure plate carried by said clutch drum for engagement with said last mentioned friction disk assembly to form a second clutch, clutch throw out mechanism reciprocably mounted upon said rear support tube rearwardly of the rear web to control the engagement and disengagement of said second clutch, transmission gearing carried by said rotatable sleeve within said transmission housing, a transmission driven shaft radially spaced from said sleeve within said transmission housing and carrying gearing meshing with the gearing on said sleeve, a cross shaft rotatably mounted in said clutch housing and extending transversely adjacent said rear support tube, a hand lever secured to said cross shaft exteriorly of said housing, a clutch throw out lever secured to said cross shaft interiorly of said housing and engageable with the clutch throw out mechanism for said second clutch, a transversely extending cross shaft rotatably mounted in said clutch housing adjacent said front support tube, a clutch throw out lever secured to said second cross shaft and engageable with the clutch throw out mechanism for said first clutch, an operating shaft rotatably mounted in said clutch housing adjacent the lower and rearward portion thereof, linkage interconnecting said second cross shaft and said operating shaft and extending diagonally rearwardly within said clutch housing, and a foot pedal secured to said operating shaft exteriorly of said clutch housing.

References Cited in the file of this patent

UNITED STATES PATENTS

| | | |
|---|---|---|
| 2,068,885 | Lyman | Jan. 26, 1937 |
| 2,261,432 | Cooke | Nov. 4, 1941 |
| 2,276,000 | Stumpf | Mar. 10, 1943 |
| 2,311,265 | Stumpf | Feb. 16, 1943 |
| 2,317,957 | Frudden | Apr. 27, 1943 |
| 2,448,822 | Pinardi | Sept. 7, 1948 |
| 2,494,505 | Bouchard | Jan. 10, 1950 |
| 2,618,979 | Benning | Nov. 25, 1952 |